(12) United States Patent
Runge et al.

(10) Patent No.: US 10,836,385 B2
(45) Date of Patent: Nov. 17, 2020

(54) LANE KEEPING ASSISTANCE SYSTEM

(71) Applicant: Deutsches Zentrum für Luft-und Raumfahrt e.V., Cologne (DE)

(72) Inventors: Hartmut Runge, Munich (DE); Robert Klarner, Munich (DE)

(73) Assignee: Deutsches Zentrum für Luft-und Raumfahrt e.V., Cologne (DE)

(*) Notice: Subject to any disclaimer, the term of this patent is extended or adjusted under 35 U.S.C. 154(b) by 196 days.

(21) Appl. No.: 15/742,695

(22) PCT Filed: Jul. 22, 2016

(86) PCT No.: PCT/EP2016/067584
§ 371 (c)(1),
(2) Date: Jan. 8, 2018

(87) PCT Pub. No.: WO2017/013260
PCT Pub. Date: Jan. 26, 2017

(65) Prior Publication Data
US 2018/0208197 A1   Jul. 26, 2018

(30) Foreign Application Priority Data
Jul. 22, 2015  (DE) .................... 10 2015 111 925

(51) Int. Cl.
*B60W 30/12* (2020.01)
*G01S 19/48* (2010.01)
(Continued)

(52) U.S. Cl.
CPC ............ *B60W 30/12* (2013.01); *B60W 40/06* (2013.01); *G01S 5/0252* (2013.01); *G01S 19/48* (2013.01);
(Continued)

(58) Field of Classification Search
CPC .. B60W 30/12; B60W 40/06; B60W 2420/42; B60W 2420/52;
(Continued)

(56) References Cited

U.S. PATENT DOCUMENTS

| | | | |
|---|---|---|---|
| 5,654,715 A | 8/1997 | Hayashikura et al. | |
| 6,385,539 B1* | 5/2002 | Wilson | G01C 21/30 340/905 |
| 8,965,685 B1* | 2/2015 | Denaro | G01C 21/3697 701/423 |
| 9,360,332 B2* | 6/2016 | Strauss | B60R 1/00 |

(Continued)

FOREIGN PATENT DOCUMENTS

| | | |
|---|---|---|
| DE | 102010033729 A1 | 2/2012 |
| DE | 102013015892 A1 | 3/2015 |

OTHER PUBLICATIONS

English translation of the International Preliminary Report on Patentability issued in International Application No. PCT/EP2016/067584 dated Feb. 1, 2018.

*Primary Examiner* — Tuan C To
(74) *Attorney, Agent, or Firm* — Hoffmann & Baron, LLP

(57) ABSTRACT

A lane keeping assistance system including position means for determining a first position of the vehicle in a network with a first accuracy; first interface for providing trajectory of the vehicle in the network; second interface for providing position data of right boundary objects and position data of left boundary objects, and radar signatures of these boundary objects; radar system to scan right and left lateral environments of the vehicle and determine distances to objects on a right of the vehicle and radar signatures thereof, and distances to objects on a left of the vehicle and radar signatures thereof; evaluation unit to perform identification of acquired objects based on the first position, the provided data, and the determined data, and to determine a second position of the vehicle with a second position accuracy; and (Continued)

control device to control the vehicle taking into consideration the target trajectory and the second position.

11 Claims, 2 Drawing Sheets

(51) Int. Cl.
*G01S 5/02* (2010.01)
*G05D 1/02* (2020.01)
*G08G 1/16* (2006.01)
*B60W 40/06* (2012.01)

(52) U.S. Cl.
CPC ......... *G05D 1/0257* (2013.01); *G05D 1/0274* (2013.01); *G05D 1/0278* (2013.01); *G08G 1/167* (2013.01); *B60W 2420/42* (2013.01); *B60W 2420/52* (2013.01); *B60W 2552/05* (2020.02); *B60W 2556/50* (2020.02); *G05D 2201/0213* (2013.01)

(58) Field of Classification Search
CPC ....... B60W 2550/141; B60W 2550/402; G01S 5/0252; G01S 19/48; G05D 1/0257; G05D 1/0274; G05D 1/0278; G05D 2201/0213; G08G 1/167
USPC ......................................................... 701/300
See application file for complete search history.

(56) References Cited

U.S. PATENT DOCUMENTS

| | | | |
|---|---|---|---|
| 2005/0062615 A1* | 3/2005 | Braeuchle | B60K 31/0008 340/903 |
| 2008/0015772 A1* | 1/2008 | Sanma | B60K 35/00 701/408 |
| 2009/0268947 A1* | 10/2009 | Schaufler | G06K 9/00805 382/104 |
| 2010/0304640 A1* | 12/2010 | Sofman | A63H 17/40 446/456 |
| 2011/0010094 A1* | 1/2011 | Simon | B60W 30/16 701/301 |
| 2012/0271540 A1* | 10/2012 | Miksa | B60W 30/12 701/409 |
| 2013/0103298 A1 | 4/2013 | Becker et al. | |
| 2013/0231825 A1* | 9/2013 | Chundrlik, Jr. | B60W 50/0098 701/29.1 |
| 2014/0088862 A1 | 3/2014 | Simon | |
| 2015/0010212 A1* | 1/2015 | Segarra | G08G 1/09626 382/104 |
| 2015/0203109 A1* | 7/2015 | McClain | B60W 30/12 701/41 |
| 2016/0082971 A1* | 3/2016 | Fuehrer | B60W 10/20 701/48 |
| 2016/0091609 A1* | 3/2016 | Ismail | G01S 19/49 702/150 |
| 2016/0139262 A1* | 5/2016 | Staynov | G01S 13/86 342/52 |
| 2016/0202352 A1 | 7/2016 | Runge et al. | |
| 2016/0321924 A1* | 11/2016 | Lewis | B60W 30/02 |

* cited by examiner

LANE KEEPING ASSISTANCE SYSTEM

CROSS REFERENCE TO RELATED APPLICATIONS

This application is the U.S. National Phase of, and Applicant claims priority from, International Patent Application No. PCT/EP2016/067584, filed on 22 Jul. 2016, and German Patent Application No. DE 10 2015 111 925.0, filed on 22 Jul. 2015, both of which are incorporated herein by reference in their entirety.

BACKGROUND

Field

The invention relates to a lane keeping assistance system, to a vehicle having such a lane keeping assistance system, and to a method for the transverse control of a vehicle.

Discussion of Related Art

Lane keeping systems are known in the prior art. Simple lane keeping systems generate, for example, haptic signals on the steering wheel, when the vehicle is about to exit a current lane. Thus, the driver can correct the transverse control of the vehicle by corresponding steering inputs. More complex lane keeping systems are, in particular, systems for the autonomous transverse control of the vehicle and they are used to autonomously guide the vehicles on a predetermined trajectory, for example, a traffic lane, a predetermined lane change, a predetermined entry or exit, etcetera.

Known lane keeping assistance systems are based substantially on the acquisition and evaluation of optical environment data, in particular, traffic lane markings. However, the traffic lane markings may not be recognizable due to soiling, snow cover, or other environmental influences (for example, dense fog).

SUMMARY

The aim of the invention is to indicate an improved lane keeping assistance system.

The invention results from the features of the independent claims. Advantageous developments and designs are the subject matter of the dependent claims. Additional features, application possibilities, and advantages of the invention result from the following description and from the explanation of embodiment examples of the invention, which are represented in the figures.

A first aspect of the invention relates to a lane keeping assistance system for a vehicle. The proposed lane keeping assistance system includes: a position means for determining a current first position P1(t) of the vehicle in a road traffic network with a position accuracy $\Delta P1$: $P1(t)=P1(t)\pm\Delta P1$, a first interface for providing a target trajectory ST(t) of the vehicle in the road traffic network, a second interface for providing georeferenced position data $P_{OR,i}$, $P_{OL,i}$ of objects $OR_i$ of a right traffic lane boundary and georeferenced position data of objects $OL_i$ of a left traffic lane boundary, and 2D or 3D radar signatures $RS_{OR,i}$ and $RS_{OL,i}$ of these objects $OR_i$, $OL_i$ for the route section of the road traffic network being traveled by the vehicle, wherein the georeferenced position data $P_{OR,i}$, $P_{OL,i}$ have a position accuracy $\Delta P2$, where $\Delta P2<\Delta P1$, i=1, 2, 3, . . . , a radar system for scanning a right and a left lateral environment of the vehicle for determining distances $D_{OR}$ to objects OR present laterally to the right of the vehicle and the radar signatures $RS_{OR}$ thereof, and distances $D_{OL}$ to objects OL present laterally to the left of the vehicle and the radar signatures $RS_{OL}$ thereof, an evaluation unit, via which initially, based on the first position P1(t), the provided data $P_{OR,i}$, $P_{OL,i}$, $RS_{OR,i}$ and $RS_{OL,i}$, and the determined data $D_{OR}$, $RS_{OR}$, $D_{OL}$, $RS_{OL}$, an identification of the determined objects OR and OL as objects $OR_i$, $OL_i$ is performed, and based thereupon, a second position P2(t) of the vehicle is determined, the position accuracy of which has the position accuracy $\Delta P2$, at least in one dimension, and a control device for the transverse control of the vehicle, via which the transverse control of the vehicle is performed, taking into consideration the target trajectory ST(t) and the position P2(t).

The position means is advantageously designed for the determination of the position P1(t) based on satellite navigation system data, or based on optical system environment data of the vehicle, or based on radar system data, or based on dead reckoning system data, or a combination thereof. Advantageously, the position means includes a GPS, a Galileo, and/or a GLONASS receiver unit. The position P1(t) is determined with a position accuracy $\Delta P1$: $P1(t)=P1(t)\pm\Delta P1$ which can vary, for example, in the case of a GPS-based navigation system, in a range between 5 and 150 m. This position accuracy is not sufficient, in particular, for autonomous vehicle operation.

Via the first interface, the target trajectory ST(t) of the vehicle is provided advantageously by a navigation system or a central system of the vehicle, or by an external central traffic control center (for example, a central server to which the vehicle is connected for the data exchange). The target trajectory ST(t) depends on the time t and provides the upcoming target route of the vehicle, preferably in georeferenced coordinates. Naturally, other reference systems are also conceivable.

A target trajectory $ST(t_k)$ predetermined for a time step $t_k$ can be provided for an upcoming time step $t_{k+1}$ via the first interface in modified form, for example, in order to take into consideration a temporally changing traffic situation, the temporally changing position P1(t) and/or P2(t) of the vehicle, also in relation to environment objects, a temporally changing vehicle state (for example, energy reserve), a predetermined new destination, etcetera. In particular, a target trajectory ST(t) can be changed based on the behavior of another traffic participant and on suddenly occurring unknown obstacles. How a target trajectory ST(t) is to be changed is not a subject matter of the present application. Instead, it is assumed here that, at each time t or for each time step $t_k$, a target trajectory ST of an upcoming target travel route for the vehicle is provided.

Via the second interface, the georeferenced position data $P_{OR,i}$, $P_{OL,i}$ of objects $OR_i$, $OL_i$ and the associated 2D or 3D radar signatures $RS_{OR,i}$ and $RS_{OL,i}$ of these objects $OR_i$, $OL_i$ are advantageously provided for the route section of the road traffic network being traveled by the vehicle, in particular, for the upcoming route section of the road traffic network, by a memory unit in the vehicle or by an external central server. In particular, the providing of the data $P_{OR,i}$, $P_{OL,i}$, $RS_{OR,i}$ and $RS_{OL,i}$ by the external central server has the advantage that the central server functions as a central database which is easier to update than a large number of memory units in vehicles. The georeferenced position data $P_{OR,i}$, $P_{OL,i}$ provided via the second interface advantageously have a position accuracy $\Delta P2$ of <0.05 m or <0.4 m or <0.3 m or <0.25 m or <0.20 m or <0.15 m or 0.10 m or <0.05 m.

With the radar system, the distances $D_{OR}/D_{OL}$ to objects OR/OL present laterally to the right/left of the vehicle and the radar signatures $RS_{OR}/RS_{OL}$ thereof are determined. The distances $D_{OR}/D_{OL}$ advantageously indicate the horizontal distance of the objects OR, OL relative to a longitudinal axis of the vehicle. The radar system advantageously enables the determination of the distances $D_{OR}/D_{OL}$ with an accuracy of <0.4 m or <0.3 m or <0.25 m or <0.20 m or <0.15 m or <0.10 m or <0.05 m. Moreover, the radar system advantageously enables the acquisition of the radar signatures $RS_{OR}/RS_{OL}$ as 2D or 3D radar signatures.

For each of the objects $OR_i/OL_i$ provided via the second interface, in addition to the georeferenced position data $P_{OR,i}$, $P_{OL,i}$, an associated 2D or 3D radar signature $RS_{OR,i}/RS_{OL,i}$ is known, so that, via a comparison of the data acquired with the radar system and the data provided via the second interface, an identification of the objects OR/OL acquired by the radar system in each case as one of the objects $OR_i$, $OL_i$ is possible.

This identification is performed by the evaluation unit. In the process, based on the first position P1(t), the provided data $P_{OR,i}$, $P_{OL,i}$, $RS_{OR,i}$ and $RS_{OL,i}$, and the determined data $D_{OR}$, $RS_{OR}$, $D_{OL}$, $RS_{OL}$, it is determined initially whether the determined radar signatures $RS_{OR}$, $RS_{OL}$ can be unequivocally associated with the data provided. If such an unequivocal assignment is determined, the objects OL, OR are considered to have been identified as objects $OR_i$, $OL_i$.

Based on the measured lateral distances $D_{OR}$, $D_{OL}$ to identified objects $OR=OR_i$ and $OL=OL_i$ to the vehicle, a second position P2(t) of the vehicle can then be determined, the position accuracy of which has the position accuracy $\Delta P2$, at least in one dimension. This one dimension (direction) is defined by the vector of the respective determined horizontal distance between vehicle and the respective object OR/OL. In a coordinate system of the vehicle in which the x axis points in the direction of the current driving direction and the y axis points in a direction perpendicular thereto, wherein the x-y plane defines the horizontal plane, the position P2(t) of the vehicle accordingly can be indicated with a position accuracy $\Delta P2$, at least along the y axis.

The position P2(t) is only determined if at least one lateral object OR or OL could be identified unequivocally. Since the objects OR/OL are arranged in-part irregularly in the lateral environment of the route section being traveled, the position is typically not determined continuously but point by point.

Advantageously, in the identification of the objects OL, OR as objects OR, OL, in the evaluation unit, a plausibility verification is carried out, wherein the probabilities W(OR), W(OL) of an unequivocal identification of objects OR, OL in each case as one of the objects $OR_i$, $OL_i$ are determined based on the determined radar signatures $RS_{OR}$ and $RS_{OL}$, the provided radar signatures $RS_{OR,i}$ and $RS_{OL,i}$, and the position P1(t). For the determination of the second position P2(t), only those acquired objects OR, OL are determined, the probabilities W(OR), W(OL) of which are above a predetermined limit value G1. For objects OR, OL, the probabilities W(OR), W(OL) of which are in each case below a predetermined limit value G1, a warning signal WARN is generated.

In this development, depending on the selection of the limit value G1 (for example, G1=90% probability), it can thus be ensured that the determined position P2(t) is robust and reliable or less robust and reliable. The generated warning signal WARN is advantageously used for marking unrecognized or unidentified objects OR, OL, which are stored in a data protocol of the evaluation unit. In particular, by using this plausibility verification, it is possible to detect whether a clear view onto the lateral environment of the vehicle or of the traffic lane was present, or whether the lateral environment is covered, for example, by other vehicles or vehicles traveling laterally with respect to the vehicle. In the last case, the probabilities W(OR), W(OL) are below the limit value G1, since the determined radar signatures and the determined distances of a vehicle traveling in an adjacent lane make it easy to distinguish the provided objects $OR_i$, $OL_i$.

Advantageously, via the second interface, data dependent on the current position P1(t)/P2(t) and on the driving direction of the vehicle is provided for the route section being traveled by the vehicle, in particular the upcoming route section. As a result, via the second interface, only currently relevant data is provided, so that the number of radar signature comparisons with objects $OR_i$, $OL_i$ taken into consideration is limited, and thus the computation times required in the evaluation units are reduced.

The transverse control of the vehicle advantageously occurs autonomously, i.e., without steering intervention of the driver. The longitudinal regulation of the vehicle occurs preferably using known vehicle longitudinal regulation systems. The proposed lane keeping assistance system can advantageously be deactivated by the driver, preferably by a manual input or a voice input. Moreover, the transverse control is advantageously deactivated automatically, if a system error was detected, for example, due to a defect of one of the parts of the proposed lane keeping assistance system or in the case of unusable measurement data of the radar system over a pre-settable time period.

Advantageously, the transverse control of the vehicle is based on an additional consideration of data of known systems for the acquisition or scanning of the vehicle environment, such as, for example, optical systems (for example, for the determination of traffic lane markings, curbstones, etc.), ultrasound systems, laser systems, LIDAR systems, etcetera. This data of known systems is advantageously taken into consideration for the verification of the data determined by the radar system and/or if these known systems themselves can determine a georeferenced position of the vehicle, in which the determination of the position P2(t) is taken into consideration.

The objects $OR_i$, $OL_i$ are advantageously firmly installed, for example, guardrails, vertical guardrail supports, curbstones, concrete deflectors, pylons, metal fences, noise control walls, sidewalls or radar reflectors, retroreflectors, corner reflectors, poles of traffic signs, overhead sign structures, and/or roadside emergency telephones. Such objects in each case have specific 2D/3D radar signatures, which can be acquired and identified by the radar system of the vehicle.

Advantageously, the provided radar signatures $RS_{OR,i}$, $RS_{OR,i}$ of the objects $OR_i$, $OL_i$ are generated based on radar signatures which were acquired using a sensor on board an aircraft or a satellite in a top view onto the surface of the earth and subsequently converted into radar signatures which can be acquired horizontally. Radar sensors on board an aircraft or a satellite enable the acquisition of a road traffic network of a country in a short time, depending on the size, for example, within a day. Thus, a high-frequency updating of the corresponding radar targets of the lateral environment of traffic lanes can be ensured.

A development of the lane keeping assistance system is characterized in that, if the evaluation unit has determined the position P2(t) for a time step $t_0$, and for time steps $t_k$ greater than $t_0$, where $t_k=t_{k-1}+\Delta t$, k=1, 2, ..., and $\Delta t$:=time increment, the warning signal WARN is generated, the evaluation unit determines for these time steps $t_k$ a position $P2'(t_k)$, where $$P2'(t_k)=P2'(t_{k-1})+\dot{P}1(t_{k-1})\Delta t, \text{ and} \quad (1)$$

the control device carries out the transverse control of the vehicle at least for a predetermined period of time ZS based on the position $P2'(t_k)$. The period of time ZS is selected advantageously depending on the speed of the vehicle from the range [10 s, 2 min]. This development assumes that for all the time steps after $t_0$ no measurement results, which can be used for a determination of a position P2(t), are available.

Advantageously, via a third interface, data is provided, which enables an optical and/or ultrasound characterization of the objects $OR_i$, $OL_i$. Moreover, the vehicle advantageously includes an optical system OPT and/or an ultrasound system US, via which the right and the left lateral environment of the vehicle can be scanned, and via which corresponding distances $D_{R,OR,OPT}$, $D_{R,OR,US}$ to objects OR present laterally to the right of the vehicle and corresponding distances $D_{L,OR,OPT}$, $D_{L,OR,US}$ to objects OL present laterally to the left of the vehicle can be determined. Moreover, the optical system OPT and/or the ultrasound system US is/are advantageously designed to identify the acquired objects as objects $OR_i$ or $OL_i$ based on the optical data acquired by the respective system or ultrasound data. In this development, the evaluation unit for the determination of the second position P2(t) advantageously takes into consideration the determined distances $D_{R,OR,OPT}$, $D_{R,OR,US}$, $D_{L,OR,OPT}$, $D_{L,OR,US}$ to the respective identified objects $OR_i$, $OL_i$. In this development, the objects $OR_i$ and $OL_i$ detected by the radar system are initially verified using an optical system OPT and/or an ultrasound system US.

A development of the lane keeping assistance system is characterized in that a transmission is made to a central station, indicating that with the radar system, at positions P1(t) or P2(t), objects OR and/or OL were determined, which are not identifiable as objects $OR_i$ and/or $OL_i$ and/or indicating that with the radar system, at positions P1(t) or P2(t), no objects OR and/or OL were determined, which, however, should be present as objects $OR_i$ and/or $OL_i$. The central station is advantageously the station which provides the georeferenced position data $P_{OR,i}$, $P_{OL,i}$ of objects $OR_i$ and $OL_i$ as well as associated 2D or 3D radar signatures $RS_{OR,i}$ and $RS_{OL,i}$ to the vehicle via the second interface. This development enables an updating of said above-mentioned data, wherein changes in the road traffic network due to vehicles with a lane keeping assistance system according to the invention are transmitted advantageously automatically to the central station.

Advantageously, the radar system has multiple laterally scanning radar sensors which in each case are distributed laterally with respect to the vehicle along the vehicle longitudinal axis. Thus, shadowing or covering of a clear radar view onto the objects can be partially compensated. For example, if the vehicle is driving in a center lane, the lateral radar view in the front area of the vehicle can be covered by another vehicle travelling forward on the side. In this case, radar sensors which are arranged in the lateral rear portion of the vehicle can nevertheless have a clear lateral radar view.

A development of the lane keeping assistance system is characterized in that the evaluation unit for identifying the objects OR and OL acquired by the radar system as objects $OR_i$, $OL_i$ acquires, with a counter $Z_L$, the number $ANZ_{OL}$ of the objects OL acquired laterally to the left, and, with a counter $Z_R$, the number $ANZ_{OR}$ of the objects OR acquired laterally to the right, wherein the quantities $ANZ_{OL}$ and $ANZ_{OR}$ are taken into consideration in the determination of the vehicle position P2(t). This is used advantageously for estimating a longitudinal position on the route section being traveled by the vehicle, in particular in the case of multiple similar radar targets OL, OR (for example, guiderail mounts) arranged adjacently next to the current traffic lane. Advantageously, the count is started anew, if one of the objects acquired by the radar system has been identified unequivocally.

Another aspect of the invention relates to a vehicle, in particular a motor vehicle, with a lane keeping assistance system as described above.

Another aspect of the invention relates to a method for the transverse control of a vehicle. This method includes the steps: determination of a current first position P1(t) of the vehicle in a road traffic network with a position accuracy $\Delta P1$: $P1(t)=P1(t)\pm\Delta P1$, providing of a target trajectory ST(t) of the vehicle in the road traffic network, providing of georeferenced position data $P_{OR,i}$, $P_{OL,i}$ of objects $OR_i$ of a right traffic lane boundary and of georeferenced position data of objects $OL_i$ of a left traffic lane boundary, and of 2D or 3D radar signatures $RS_{OR,i}$ and $RS_{OL,i}$ of these objects $OR_i$, $OL_i$, for the route section of the road traffic network being traveled by the vehicle, wherein the georeferenced position data $P_{OR,i}$, $P_{OL,i}$ have a position accuracy $\Delta P2$ of <0.15 m, where $\Delta P2<\Delta P1$, i=1, 2, 3, ..., scanning via a radar system of a right and of a left lateral environment of the vehicle for the determination of distances $D_{OR}$ to objects OR present laterally to the right of the vehicle and the radar signatures $RS_{OR}$ thereof, and of distances $D_{OL}$ of objects OL present laterally to the left of the vehicle and the radar signatures $RS_{OL}$ thereof, based on the first position P1(t), the provided data $P_{OR,i}$, $P_{OL,i}$, $RS_{OR,i}$ and $RS_{OL,i}$, and the determined data $D_{OR}$, $RS_{OR}$, $D_{OL}$, $RS_{OL}$, determination of a second position P2(t) of the vehicle, the position accuracy of which has the position accuracy $\Delta P2$ at least in one dimension, and performance of the transverse control of the vehicle taking into consideration the target trajectory ST(t) and the position P2(t).

Developments and advantages of the invention result from an analogous and appropriate transfer of the preceding explanations of the lane keeping assistance system.

The aim of the invention is achieved moreover by a computer system with a data processing device, wherein the data processing device is designed in such a manner that a method, as described above, is carried out on the data processing device.

In addition, the aim of the invention is achieved by a digital storage medium with electronically readable control signals, wherein the control signals can thus work together with a programmable computer system so that a method, as described above, is carried out.

Furthermore, the aim of the invention is achieved by a computer program product with a program code stored on a machine readable support for carrying out the method, as described above, if the program code is executed on a data processing device.

Finally, the invention relates to a computer program with program codes for carrying out the method, as described above, if the program runs on a data processing device. For this purpose, the data processing device can be designed as any computer system known from the prior art.

BRIEF DESCRIPTION OF THE DRAWINGS

Additional advantages, features, and details result from the following description, wherein—if applicable in reference to the drawings—at least one embodiment example is described in detail. Identical, similar and/or functionally equivalent parts are provided with identical reference numerals.

In the drawings.

DETAILED DESCRIPTION

Figure 1:
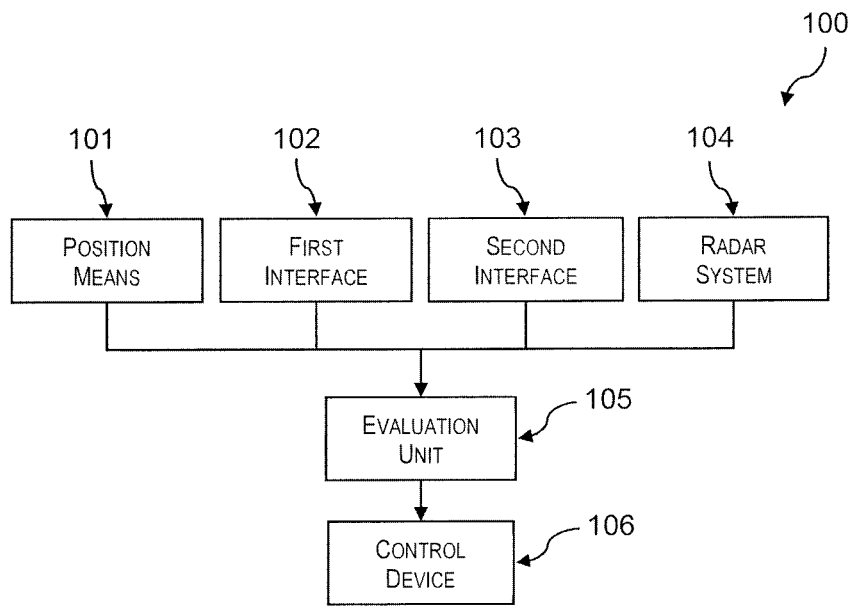
FIG. 1 shows a schematic design of a lane keeping assistance system according to the invention.
Figure 3:
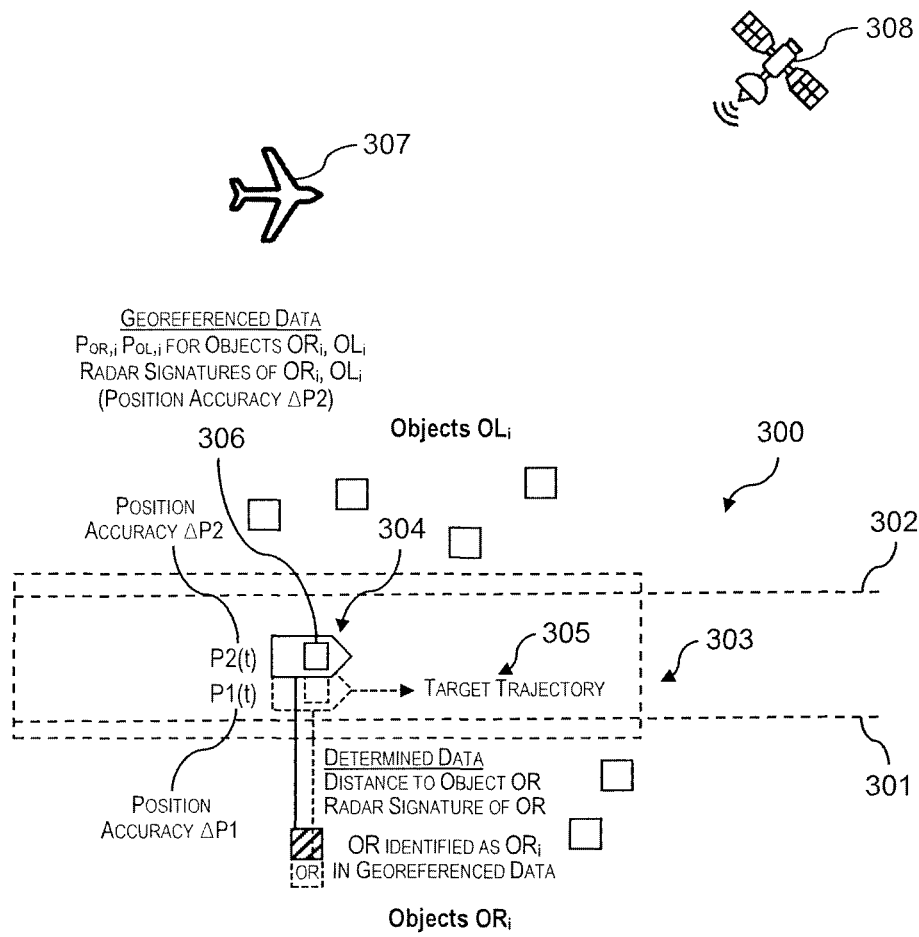
FIG. 3 shows a schematic design of a road traffic network in which the lane keeping assistance system shown in FIG. 1 and method shown in FIG. 2 are applicable.

FIG. 1 shows a schematic design of an inventive lane keeping assistance system 100, in view of FIG. 3 that shows a road traffic network 300 in which the lane keeping assistance system 100 is applicable. The lane keeping assistance system 100 includes a position means 101, a first interface 102, a second interface 103, a radar system 104, an evaluation unit 105, and a control device 106.

The position means 101 determines a current first position P1(t) of a vehicle 304 in the road traffic network 300 with a position accuracy $\Delta P1$: $P1(t)=P1(t)\pm APE$ The first interface 102 provides a target trajectory ST(t) 305 of the vehicle 304 in the road traffic network 300. The second interface 103 provides georeferenced position data $P_{OR,i}$ of objects $OR_i$ of a right traffic lane boundary 301 and georeferenced position data $P_{OR,i}$ of objects OL, of a left traffic lane boundary 302, and 2D or 3D radar signatures $RS_{OR,i}$ and $RS_{OL,i}$ of these objects $OR_i$ and $OL_i$ for a route section 303 of the road traffic network 300 being traveled by the vehicle 304, wherein the georeferenced position data $P_{OR,i}$, $P_{OL,i}$ have a position accuracy $\Delta P2$, where $\Delta P2<\Delta P1$, $i=1, 2, 3, \ldots$, the foregoing position and signature data collectively referred to as georeferenced data 306 of objects $OR_i$, $OL_i$.

The radar system 104 scans a right lateral environment and a left lateral environment of the vehicle for the determination of distances $D_{OR}$ to objects OR present laterally to the right of the vehicle 304 and the radar signatures $RS_{OR}$ thereof, and distances $D_{OL}$ to objects OL present laterally to the left of the vehicle and the radar signatures $RS_{OL}$ thereof, the foregoing distance and signature data collectively referred to as determined data of acquired objects OR, OL.

The evaluation unit 105, based on the first position P1(t), the provided georeferenced data $P_{OR,i}$, $P_{OL,i}$, $RS_{OR,i}$ and $RS_{OL,i}$, and the determined data $D_{OR}$, $RS_{OR}$, $D_{OL}$, $RS_{OL}$, performs an identification of the acquired objects OR and OL as objects $OR_i$, $OL_i$, and based on a successful identification, determines a second position P2(t) of the vehicle 304 using georeferenced position data $P_{OR,i}$ of an identified object $OR_i$ coupled with a determined distance $D_{OR}$ of an object OR associated with the successful identification of the object OR as the object $OR_i$ or using the georeferenced position data $P_{OL,i}$ of an identified object $OL_i$ coupled with a distance $D_{OL}$ of an object OL associated with the successful identification of the object OL as the object $OL_i$, wherein the second position P2(t) has the position accuracy $\Delta P2$: $P2(t)=P2(t)\pm\Delta P2$, at least in one direction.

The control device 106 transversely controls the vehicle 304, taking into consideration the target trajectory ST(t) 305 and the second position P2(t) of the vehicle.

Figure 2:
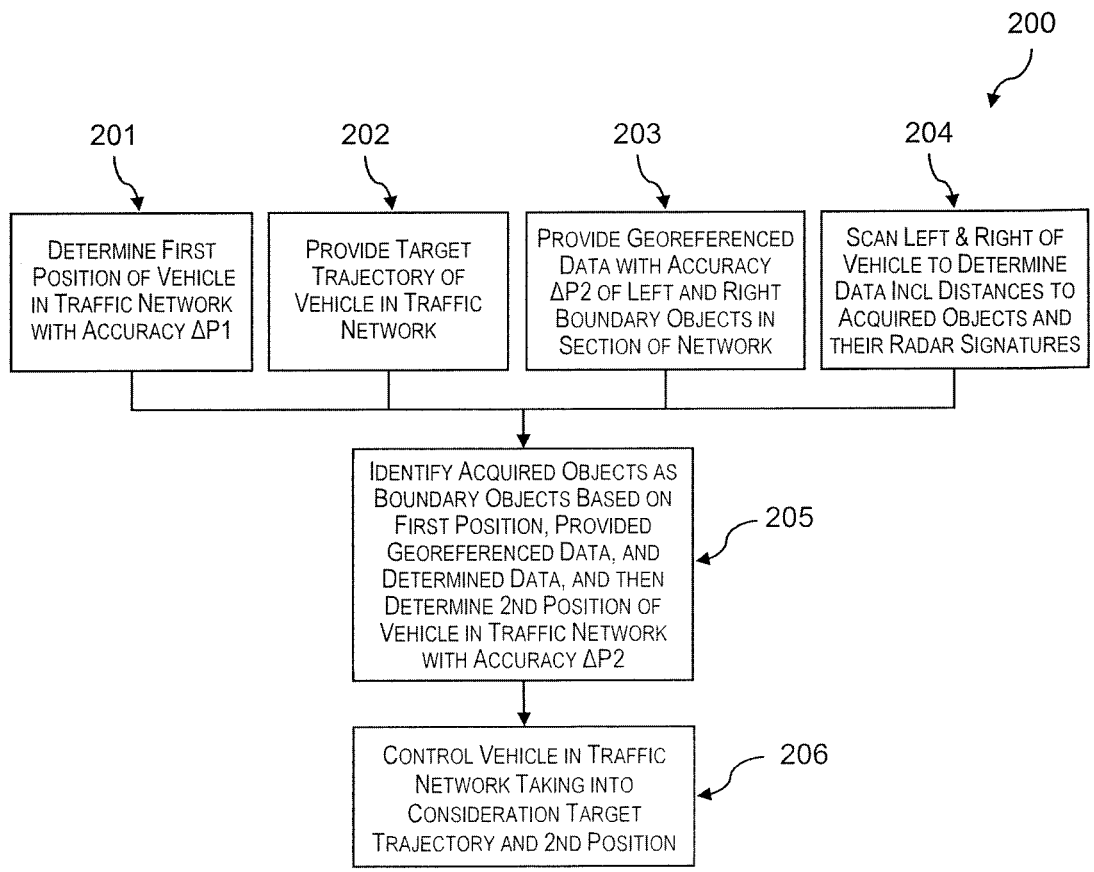
FIG. 2 shows a schematic flowchart of a method for transverse control of a vehicle in a route network according to the invention.

FIG. 2 shows a schematic flowchart of an inventive method 200 for the transverse control of a vehicle 304 in a road traffic network 300 of FIG. 3. The method includes the following steps. In step 201, there is determined a current first position P1(t) of the vehicle 304 in the road traffic network 300 with a position accuracy $\Delta P1$: $P1(t)=P1(t)\pm\Delta P1$. In step 202, there is provided a target trajectory ST(t) 305 of the vehicle 304 in the road traffic network 300. In a step 203, there is provided georeferenced position data $P_{OR,i}$ of objects $OR_i$ of a right traffic lane boundary and of georeferenced position data $P_{OL,i}$ of objects $OL_i$ of a left traffic lane boundary, and of 2D or 3D radar signatures $RS_{OR,i}$ and $RS_{OL,i}$ of these objects $OR_i$, $OL_i$, for the route section 303 of the road traffic network 300 being traveled by the vehicle 304, wherein the georeferenced position data $P_{OR,i}$, $P_{OL,i}$ have a position accuracy $\Delta P2$ of <0.15 m, where $\Delta P2<\Delta P1$, $i=1, 2, 3, \ldots$, the foregoing position and signature data collectively referred to as georeferenced data 306 of objects $OR_i$, $OL_i$.

In step 204, using the radar system 104, there is performed a scanning of a right and of a left lateral environment of the vehicle 304 for the determination of distances $D_{OR}$ to objects OR present laterally to the right of the vehicle 304 and the radar signatures $RS_{OR}$ thereof, and of distances $D_{OL}$ of objects OL present laterally to the left of the vehicle 304 and the radar signatures $RS_{OL}$ thereof. In step 205, based on the first position P1(t), the provided georeferenced data $P_{OR,i}$, $P_{OL,i}$, $RS_{OR,i}$ and $RS_{OL,i}$, and the determined data $D_{OR}$, $RS_{OR}$, $D_{OL}$, $RS_{OL}$, there is performed a determination of a second position P2(t) of the vehicle, the position accuracy of which has the position accuracy $\Delta P2$ at least in one direction. In a step 206, there is performed a transverse control of the vehicle 304, taking into consideration the target trajectory ST(t) and the position P2(t).

FIG. 3 shows a schematic design of a road traffic network 300 in which the lane keeping assistance system 100 of FIG. 1 and the method shown in FIG. 2 are applicable. In this regard, it is understood that vehicle 304 includes the lane keeping assistance system 100 as shown in FIG. 1, and can be controlled as it travels along the road traffic network 300 using the lane keeping assistance method as shown in FIG. 2. As particularly shown in FIG. 3, the road traffic network 300 includes a right traffic boundary 301 and a left traffic boundary 302, and the vehicle 304 travels along the road traffic network 300 generally between the right and left traffic boundaries 301, 302.

Figure 4:
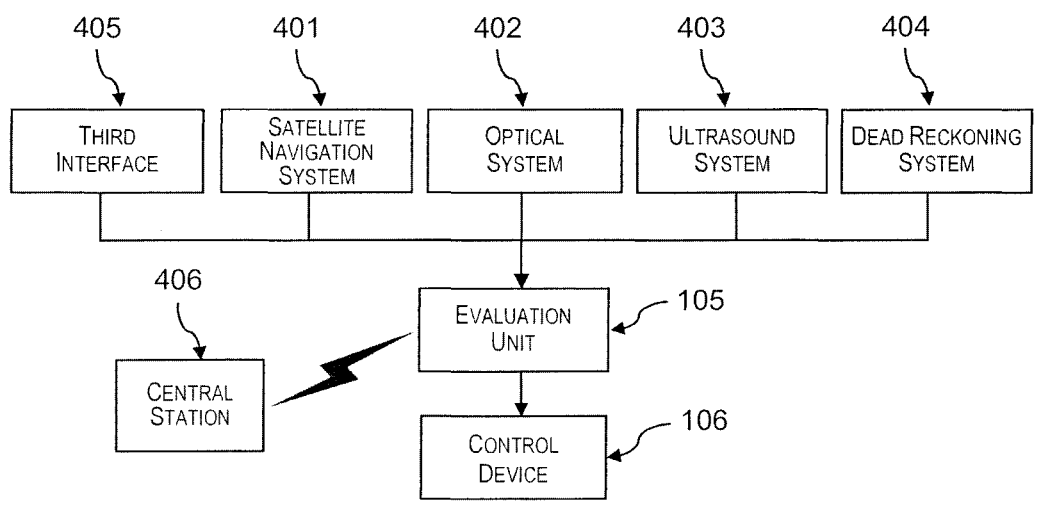
FIG. 4 shows a schematic design of optional components of the lane keeping assistance system shown in FIG. 1 in relation to the road traffic network shown in FIG. 3.

The first position P1(t) having a position accuracy $\Delta P1$ is determined for the vehicle 304 in the road traffic network 300 using the position means 101. The position means 101 can include a radar system 104 as shown in FIG. 1, a satellite navigation system 401 that communicates with satellites 308, an optical system 402, an ultrasound system 403, or a dead reckoning system 404, as shown in FIG. 4, or a combination thereof. For example, as described hereinabove, the position accuracy $\Delta P1$ of the first position P1(t) is relatively and generally imprecise, for example, in the case of a satellite navigation system 401, in a range between 5 m and 150 m, and as such, the position accuracy is not sufficient in characterizing the first position P1(t) for use in autonomous vehicle operation.

The target trajectory ST(t) 305 provides the upcoming target route of the vehicle 304. As described hereinabove, target trajectory ST(t) 305 of the vehicle 304 in the road network 300 can be provided by the satellite navigation system 401 of FIG. 4, a central system of the vehicle, or an external central traffic control center (e.g., a central server to which the vehicle is connected for data exchange).

The georeferenced position data 306 include positions $P_{OR,i}$ of the objects OR, of the right traffic lane boundary 301 and positions $P_{OL,i}$ of objects OL, of the left traffic lane boundary 302, and radar signatures $RS_{OR,i}$, $RS_{OL,i}$ of the respective objects $OR_i$, $OL_i$, for a route section 303 of the road traffic network 300 associated with travel of the vehicle 304, wherein the foregoing georeferenced position data have a position accuracy ΔP2. As described hereinabove, the georeferenced position data 306 are relatively and significantly more precise (e.g., position accuracy of 0.5 m-0.05 m) than the first position P1(t) of the vehicle 304 (e.g., position accuracy of 5 m-15 m). The radar signatures $RS_{OR,i}$, $RS_{OL,i}$ of the georeferenced position data 306 can be those resulting from signatures acquired by an airplane 307 or a satellite 308 from a top view of the objects $P_{OR,i}$, $P_{OL,i}$, and converted to signatures that can be acquirable by the radar system 104 of the vehicle 304.

The right and the left environments of the vehicle 304 are scanned using the radar system 104. The radar system 104 determines distances $D_{OR}$ to objects OR on the right and their radar signatures $RS_{OR}$, and similarly distances $D_{OL}$ of objects OL on the left and their radar signatures $RS_{OL}$. P1(t). Moreover, the radar system 104 enables the acquisition of the radar signatures $RS_{OR}$, $RS_{OL}$. As described hereinabove, the determined distance data $D_{OR}$, $D_{OL}$ have relatively precise distance accuracy (e.g., 0.4 m-0.05 m), which in combination with radar signatures $RS_{OR}$, $RS_{OL}$ help the evaluation unit 105 to identify objects OR, OL as respective objects $OL_i$, $OL_i$, as described below.

The evaluation unit 105 performs determination of a second position of the vehicle P2(t) based on the first position P1(t) of the vehicle 304, the georeferenced data, and the determined data, wherein P2(t) has a position accuracy ΔP2. In particular, based on the first position P1(t), the provided data $P_{OR,i}$, $P_{OL,i}$, $RS_{OR,i}$ and $RS_{OL,i}$, and the determined data $D_{OR}$, $RS_{OR}$, $D_{OL}$, $RS_{OL}$, the evaluation unit 105 initially performs an identification of the objects OR and OL as respective objects $OR_i$ and $OL_i$. Thereafter, based on a successful identification (e.g., object OR successfully identified as object $OR_i$, which is illustrated as cross-hatched), the evaluation unit 105 determines a second position P2(t) of the vehicle 304 using georeferenced position data $P_{OR,i}$ of an identified object $OR_i$ coupled with a determined distance $D_{OR}$ of an object OR associated with the successful identification of the object OR as the object $OR_i$, or using the georeferenced position data $P_{OL,i}$ of an identified object $OL_i$ coupled with a distance $D_{OL}$ of an object OL associated with the successful identification of the object OL as the object $OL_i$.

Thereafter, the control device 106 performs transverse control of the vehicle 304 in the road traffic network 300, taking into consideration the target trajectory ST(t) and the second position P2(t) of the vehicle 304. In this regard, the relatively precise position of the georeferenced data coupled with the relatively precise distance of the determined data, based on a successful identification, enables determination of the second position P2(t) of the vehicle 304 that is relatively and significantly more precise than the first P1(t) of the vehicle 304, and as such, transverse control of the vehicle 304 can be performed in the route road traffic network 300 for autonomous operation of the vehicle 304.

FIG. 4 shows a schematic design of optional components 400 of the lane keeping assistance system 100 as shown in FIG. 1, in relation to the road traffic network 300 as shown in FIG. 3. The lane keeping assistance system 100 can include a satellite navigation system 401, an optical system OPT 402, an ultrasound system US 403, a dead reckoning system 404, or combinations thereof. The lane keeping assistance system 100 can also include a third interface 405 connected to the evaluation unit 105 of FIG. 1, which can further be in communication with a central station 406.

Via the third interface 405, data can be provided that enables optical and/or ultrasound characterization of the objects $OR_i$, $OL_i$. The optical system OPT 402 and/or an ultrasound system US 403, can be used to scan the right and left lateral environments of the vehicle 304, and further to determine corresponding distances $D_{R,OR,OPT}$, $D_{R,OR,US}$ to objects OR present to the right of the vehicle 304 and corresponding distances $D_{L,OR,OPT}$, $D_{L,OR,US}$ to objects OL present laterally to the left of the vehicle 304 can be determined.

Moreover, the optical system OPT 402 and/or the ultrasound system US can also be used to identify the acquired objects as objects $OR_i$ or $OL_i$ based on the optical data and/or ultrasound data acquired by the respective systems 402, 403. Moreover, the evaluation unit 105, for the determination of the second position P2(t), can thus take into consideration the determined distances $D_{R,OR,OPT}$, $D_{L,OR,OPT}$ and/or $D_{R,OR,US}$, $D_{L,OR,US}$ to the respective identified objects $OR_i$, $OL_i$. In this development, the objects $OR_i$ and $OL_i$ detected by the radar system 104 of FIG. 1 can be initially verified using an optical system OPT 402 and/or an ultrasound system US 403 of FIG. 4.

In the lane keeping assistance system 100, the evaluation unit 105 can also make a transmission to a central station 406, indicating that with the radar system 104, at positions P1(t) and/or P2(t), objects OR and/or OL were determined, which are not identifiable as objects $OR_i$ and/or $OL_i$, and/or indicating that with the radar system 104, at positions P1(t) and/or P2(t), no objects OR and/or OL were determined, which, however, should be present as objects $OR_i$ and/or $OL_i$. Moreover, the central station 406 can provide the georeferenced position data $P_{OR,i}$, $P_{OL,i}$ of objects $OR_i$ and $OL_i$ as well as associated 2D or 3D radar signatures $RS_{OR,i}$ and $RS_{OL,i}$ to the vehicle 304 via the second interface 103.

Although the invention was illustrated and explained in further detail by preferred embodiments, the invention is not limited by the disclosed examples, and other variations can be derived therefrom by the person skilled in the art, without leaving the scope of protection of the invention. Therefore, it is clear that numerous variation possibilities exist. It is also clear that embodiments mentioned as example represent in fact only examples which in no way should be taken as a limitation of, for example, the scope of protection, the application possibilities or the configuration of the invention. Instead, the above description and the description of figures enable the person skilled in the art to concretely implement the exemplary embodiments, wherein the person skilled in the art, in the knowledge of the disclosed inventive idea, can make various changes, for example, with regard to the function or the arrangement, in an exemplary embodiment of mentioned examples, without leaving the scope of protection which is defined by the claims and their legal equivalents such as, for example, further explanations in the description.

The invention claimed is:

1. A lane keeping assistance system for transverse control of a vehicle, the system comprising:
   a position means for determining a current first position P1(t) of the vehicle in a road traffic network, wherein the first position P1(t) has a position accuracy ΔP1: P1(t)=P1(t)±ΔP1;
   a first interface to provide a target trajectory ST(t) of the vehicle in the road traffic network;

a second interface to provide georeferenced position data $P_{OR,i}$ of objects $OR_i$ of a right traffic lane boundary and georeferenced position data $P_{OL,i}$ of objects $OL_i$ of a left traffic lane boundary, and 2D or 3D radar signatures $RS_{OR,i}$ and $RS_{OL,i}$ of the objects $OR_i$ and $OL_i$ for a route section of the road traffic network being traveled by the vehicle, wherein the georeferenced position data $P_{OR,i}$ and $P_{OL,i}$ have a position accuracy of $\Delta P2$, where $\Delta P2 < \Delta P1$, i=1, 2, 3, . . . ;

a radar system to scan a right lateral environment and a left lateral environment of the vehicle to determine data including distances $D_{OR}$ to objects OR present laterally to the right of the vehicle and radar signatures $RS_{OR}$ of the objects OR, and distances $D_{OL}$ to objects OL present laterally to the left of the vehicle and radar signatures $RS_{OL}$ of the objects OL;

an evaluation unit, via which initially, based on the first position P1(t), provided data $P_{OR,i}$, $P_{OL,i}$, $RS_{OR,i}$, and $RS_{OL,i}$, and determined data $D_{OR}$, $D_{OL}$, $RS_{OR}$, and $RS_{OL}$, an identification of the objects OR and OL as respective objects $OR_i$ and $OL_i$ is performed, and based on a successful identification, a second position P2(t) of the vehicle is determined using georeferenced position data $P_{OR,i}$ of an identified object $OR_i$ coupled with a determined distance $D_{OR}$ of an object OR associated with the successful identification of the object OR as the object $OR_i$, or using the georeferenced position data $P_{OL,i}$ of an identified object $OL_i$ coupled with a distance $D_{OL}$ of an object OL associated with the successful identification of the object OL as the object $OL_i$, wherein the second position P2(t) has a position accuracy $\Delta P2$: P2(t)=P2(t)±$\Delta P2$, at least in one dimension; and a control device to perform transverse control of the vehicle in the road traffic network taking into consideration the target trajectory ST(t) and the second position P2(t) of the vehicle.

2. The lane keeping assistance system according to claim 1, wherein the position means for determining the first position P1(t) is designed based on data of a satellite navigation system, or based on optical environment data of an optical system, or based on radar data of the radar system, or based on dead reckoning data of a dead reckoning system, or a combination of these data.

3. The lane keeping assistance system according to claim 1, wherein the objects $OR_i$ and $OL_i$ are guardrails, vertical guardrail supports, curbstones, concrete deflectors, pylons, metal fences, noise control walls, side walls or radar reflectors, retroreflectors, corner reflectors, poles of traffic signs, overhead sign structures, or roadside emergency telephones.

4. The lane keeping assistance system according to claim 1, wherein the radar signatures $RS_{OR,i}$ and $RS_{OL,i}$ of the objects $OR_i$ and $OL_i$ are based on radar signatures acquired by a sensor on board an aircraft or on board a satellite in top view and converted to radar signatures acquirable by the radar system of the vehicle.

5. The lane keeping assistance system according to claim 1, wherein the evaluation unit is designed and set up for a plausibility verification, wherein probabilities W(OR) and W(OL) of an unequivocal identification of objects OR and OL are determined in each case as one of the objects $OR_i$ and $OL_i$ based on the determined radar signatures $RS_{OR}$ and $RS_{OL}$, the provided radar signatures $RS_{OR,i}$ and $RS_{OL,i}$ and the first position P1(t), wherein, for the determination of the second position P2(t), only those objects OR and OL are used, the probabilities W(OR) and W(OL) of which are above a predetermined limit value G1, and wherein for objects OR and OL, the probabilities W(OR) and W(OL) of which in each case are below the predetermined limit value G1, a warning signal WARN is generated.

6. The lane keeping assistance system according to claim 5, wherein, in the case in which the evaluation unit has determined the second position P2(t) at a time step $t_0$, and for time steps $t_k$ greater than $t_0$, where $t_k=t_{k-1}+\Delta t$, k=1, 2, . . . , and $\Delta t$:=time increment, the warning signal WARN is generated, the evaluation unit for these time steps $t_k$ determines a position P2'(t), where $$P2'(t_k)=P2'(t_{k-1})+\dot{P}1(t_{k-1})\Delta t, \text{ and} \quad (1)$$

the control device carries out the transverse control of the vehicle at least for a predetermined period of time ZS based on the position P2'($t_k$).

7. The lane keeping assistance system according to claim 1, wherein the system comprises:

a third interface, via which data is provided that enables an optical characterization and/or ultrasound characterization of the objects $OR_i$ and $OL_i$; and an optical system OPT and/or an ultrasound system US for scanning the right lateral environment and the left lateral environment of the vehicle for the determination of distances $D_{R,OR,OPT}$ and/or $D_{R,OR,US}$ to objects OR present laterally to the right of the vehicle and for the identification thereof as objects $OR_i$, and of distances $D_{L,OR,OPT}$ and/or $D_{L,OR,US}$ to objects OL present laterally to the left of the vehicle and for the identification thereof as objects $OL_i$; wherein in determination of the second position P2(t), the evaluation unit takes into consideration the distances $D_{R,OR,OPT}$, $D_{L,OL,OPT}$ and/or $D_{R,OR,US}$, $D_{L,OR,US}$ to the respective identified objects $OR_i$ and $OL_i$.

8. The lane keeping assistance system according to claim 1, wherein the evaluation unit is designed and set up in such a manner that a transmission to a central station is made, indicating that, with the radar system, at positions P1(t) or P2(t), objects OR and/or OL were determined, which are not identifiable as objects $OR_i$ and/or $OL_i$ and/or that, with the radar system, at positions P1(t) or P2(t), no objects OR and/or OL were determined, which, however, should be present as objects $OR_i$ and/or $OL_i$.

9. The lane keeping assistance system according to claim 1, wherein, in identification of the objects OR and OL acquired with the radar system, the evaluation unit acquires, as objects $OR_i$ and $OL_i$, with a counter $Z_L$, a number $ANZ_{OL}$ of the objects OL acquired laterally to the left, and with a counter $Z_R$, a number $ANZ_{OR}$ of the objects OR acquired laterally to the right, wherein the quantities $ANZ_{OL}$ and $ANZ_{OR}$ are taken into consideration in the determination of the vehicle position P2(t).

10. A method for the transverse control of a vehicle, the method comprising:

determining a current first position P(t) of the vehicle in a road traffic network, wherein the first position P1(t) has a position accuracy $\Delta P1$: P1(t)=P1(t)±$\Delta P1$;

providing a target trajectory ST(t) of the vehicle in the road traffic network;

providing georeferenced position data $P_{OR,i}$ of objects $OR_i$ of a right traffic lane boundary and georeferenced position data $P_{OL,i}$ of objects $OL_i$ of a left traffic lane boundary, and 2D or 3D radar signatures $RS_{OR,i}$ and $RS_{OL,i}$ of the objects $OR_i$ and $OL_i$, for a route section of the road traffic network being traveled by the vehicle, wherein the georeferenced position data $P_{OR,i}$ and $P_{OL,i}$ have a position accuracy $\Delta P2$, where $\Delta P2 < \Delta P1$, i=1, 2, 3, . . . ;

scanning, using a radar system, a right lateral environment and a left lateral environment of the vehicle to determine data including distances $D_{OR}$ to objects OR present laterally to the right of the vehicle and radar signatures $RS_{OR}$ of the objects OR, and distances $D_{OL}$ to objects OL present laterally to the left of the vehicle and radar signatures $RS_{OL}$ objets OL;

performing initially, based on the first position P1(t), provided data $P_{OR,i}$, $P_{OL,i}$, $RS_{OR,i}$, and $RS_{OL,i}$, and determined data $D_{OR}$, $D_{OL}$, $RS_{OR}$, and $RS_{OL}$, an identification of the objects OR and OL as respective objects $OR_i$ and $OL_i$, and based on a successful identification, determining a second position P2(t) of the vehicle using georeferenced position data $P_{OR,i}$ of an identified object $OR_i$ coupled with a determined distance $D_{OR}$ of an object OR associated with the successful identification of the object OR as the object $OR_i$, or using the georeferenced position data $P_{OL,i}$ of an identified object $OL_i$ coupled with a distance $D_{OL}$ of an object OL associated with the successful identification of the object OL as the object $OL_i$, wherein the second position P2(t) has a position accuracy $\Delta P2$: P2(t)=P2(t)±$\Delta P2$, at least in one dimension; and performing transverse control of the vehicle road traffic network taking into consideration the target trajectory ST(t) and the second position P2(t) of the vehicle.

11. A lane keeping system for the transverse control of a vehicle, the system comprising:

a processing device; and a memory storing instructions that, when executed the processing device, cause the processing device to perform instructions comprising:

determining a current first position P1(t) of the vehicle in a road traffic network, wherein the first position P1(t) has a position accuracy $\Delta P1$: P1(t)=P1(t)±$\Delta P1$;

providing a target trajectory ST(t) of the vehicle in the road traffic network;

providing georeferenced position data $P_{OR,i}$ of objects $OR_i$ of a right traffic lane boundary and georeferenced position data $P_{OL,i}$ of objects $OL_i$ of a left traffic lane boundary, and 2D or 3D radar signatures $RS_{OR,i}$ and $RS_{OL,i}$ of the objects $OR_i$ and $OL_i$, for a route section of the road traffic network being traveled by the vehicle, wherein the georeferenced position data $P_{OR,i}$ and $P_{OL,i}$ have a position accuracy $\Delta P2$, where $\Delta P2<\Delta P1$, i=1, 2, 3, . . . ;

scanning, using a radar system, a right lateral environment and a left lateral environment of the vehicle to determine data including distances $D_{OR}$ to objects OR present laterally to the right of the vehicle and radar signatures $RS_{OR}$ of the objects OR, and distances $D_{OL}$ to objects OL present laterally to the left of the vehicle and radar signatures $RS_{OL}$ objects OL;

performing initially, based on the first position P1(t), the provided data $P_{OR,i}$, $P_{OL,i}$, $RS_{OR,i}$, and $RS_{OL,i}$, and determined data $D_{OR}$, $D_{OL}$, $RS_{OR}$, and $RS_{OL}$, an identification of the objects OR and OL as respective objects $OR_i$ and $OL_i$, and based on a successful identification, determining a second position P2(t) of the vehicle using georeferenced position data $P_{OR,i}$ of an identified object $OR_i$ coupled with a determined distance $D_{OR}$ of an object OR associated with the successful identification of the object OR as the object $OR_i$, or using the georeferenced position data $P_{OL,i}$ of an identified object $OL_i$ coupled with a distance $D_{OL}$ of an object OL associated with the successful identification of the object OL as the object $OL_i$, wherein the second position P2(t) has a position accuracy $\Delta P2$: P2(t)=P2(t)±$\Delta P2$, at least in one dimension; and performing transverse control of the vehicle road traffic network taking into consideration the target trajectory ST(t) and the second position P2(t) of the vehicle.

* * * * *

UNITED STATES PATENT AND TRADEMARK OFFICE
CERTIFICATE OF CORRECTION

Page 1 of 1

PATENT NO. : 10,836,385 B2
APPLICATION NO. : 15/742695
DATED : November 17, 2020
INVENTOR(S) : Hartmut Runge et al.

It is certified that error appears in the above-identified patent and that said Letters Patent is hereby corrected as shown below:

In the Claims

<u>Claim 11, Column 13, Lines 31-32:</u>
Now reads: "perform instructions comprising:"
Should read: -- perform operations comprising: --

Signed and Sealed this
Twenty-third Day of February, 2021

Drew Hirshfeld
*Performing the Functions and Duties of the
Under Secretary of Commerce for Intellectual Property and
Director of the United States Patent and Trademark Office*